United States Patent
Church

(10) Patent No.: US 10,837,485 B2
(45) Date of Patent: Nov. 17, 2020

(54) METHODS AND SYSTEMS FOR A CRANKSHAFT STABILIZING DEVICE

(71) Applicant: Ford Global Technologies, LLC, Dearborn, MI (US)

(72) Inventor: Jeremy Church, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 15/973,248

(22) Filed: May 7, 2018

(65) Prior Publication Data

US 2019/0338805 A1    Nov. 7, 2019

(51) Int. Cl.
| | | |
|---|---|---|
| *F16C 3/16* | (2006.01) | |
| *F01P 1/06* | (2006.01) | |
| *F16C 3/20* | (2006.01) | |
| *F16F 15/12* | (2006.01) | |
| *F16F 15/126* | (2006.01) | |

(52) U.S. Cl.
CPC .................. *F16C 3/16* (2013.01); *F01P 1/06* (2013.01); *F16C 3/20* (2013.01); *F16F 15/12* (2013.01); *F16F 15/126* (2013.01); *F16F 2222/025* (2013.01)

(58) Field of Classification Search
CPC ...... F16C 3/16; F16C 3/20; F16C 3/18; F16C 3/14; F01P 1/06; F16F 15/12; F16F 2222/025; F16F 15/126
See application file for complete search history.

(56) References Cited

U.S. PATENT DOCUMENTS

| | | | | |
|---|---|---|---|---|
| 2,159,235 | A | * 5/1939 | Tyler | F16D 3/68 74/574.4 |
| 2,253,408 | A | * 8/1941 | Watkins | B62M 7/12 180/223 |
| 2,716,904 | A | * 9/1955 | Schuldt | F02B 75/06 74/574.2 |
| 2,795,036 | A | * 6/1957 | Haushalter | F16F 15/1442 29/450 |
| 2,882,747 | A | * 4/1959 | Haushalter | F16F 15/1442 74/574.4 |
| 4,041,803 | A | * 8/1977 | Goloff | F16F 9/145 74/574.4 |
| 4,178,811 | A | | 12/1979 | Shepherd |
| 4,223,240 | A | * 9/1980 | Theyse | F16C 27/08 310/74 |
| 4,307,627 | A | | 12/1981 | Sullivan |
| 5,723,923 | A | * 3/1998 | Clagett | B64G 1/283 290/36 R |
| 5,788,007 | A | * 8/1998 | Miekka | B60L 3/0061 180/205.1 |
| 5,811,756 | A | | 9/1998 | Horita et al. |
| 5,962,941 | A | | 10/1999 | Serdar, Jr. et al. |
| 5,998,899 | A | * 12/1999 | Rosen | F16C 32/0446 310/112 |
| 6,044,818 | A | | 4/2000 | Decuir |

(Continued)

*Primary Examiner* — Hung Q Nguyen
*Assistant Examiner* — Susan E Scharpf
(74) *Attorney, Agent, or Firm* — Geoffrey Brumbaugh; McCoy Russell LLP

(57) ABSTRACT

Methods and systems are provided for a stabilizing device of a crankshaft. In one example, a method may comprise randomizing a shape of each fin of a plurality of fins and a space between each fin. Randomizing the fins may decrease noise production as a result of airflow generated by the fins.

18 Claims, 5 Drawing Sheets

(56) References Cited

U.S. PATENT DOCUMENTS

| | | | |
|---|---|---|---|
| 6,092,795 A | | 7/2000 | McGuire |
| 6,129,193 A * | | 10/2000 | Link ................... B60H 1/3222 |
| | | | 192/84.1 |
| 6,144,128 A * | | 11/2000 | Rosen ................. H02K 11/048 |
| | | | 310/74 |
| 6,585,092 B1 | | 7/2003 | Smith et al. |
| 7,174,806 B2 * | | 2/2007 | Brackett ............... F16F 15/315 |
| | | | 165/185 |
| 7,484,434 B2 | | 2/2009 | Jung et al. |
| 7,679,245 B2 * | | 3/2010 | Brackett ............. F16C 32/0427 |
| | | | 310/90.5 |
| 2003/0226723 A1 * | | 12/2003 | Matsueda ................. B62L 5/16 |
| | | | 188/26 |
| 2005/0146201 A1 * | | 7/2005 | Cavazos .................. B60B 7/20 |
| | | | 301/37.25 |
| 2006/0124426 A1 | | 6/2006 | Kiener et al. |
| 2009/0159382 A1 * | | 6/2009 | Chemouni ............. F16F 9/145 |
| | | | 188/290 |
| 2017/0248191 A1 * | | 8/2017 | Husband ............... B22F 3/1055 |

\* cited by examiner

FIG. 1

METHODS AND SYSTEMS FOR A CRANKSHAFT STABILIZING DEVICE

FIELD

The present description relates generally to dissipating heat for a crankshaft damper via a stabilizing device.

BACKGROUND/SUMMARY

A crankshaft may be used to convert reciprocating motion, such as that of a piston, to rotational motion for wheels to propel a device (e.g., a vehicle). To accomplish the conversion, the crankshaft may be off an axis of reciprocation of the piston, which may correlate to a relatively high leverage of a connection between the crankshaft and a connecting rod. Furthermore, piston movement may be offset. For example, some pistons may be moving upward and some pistons may be moving downward simultaneously. Each of these factors may increase a likelihood of crankshaft degradation (e.g., twisting) which may be accompanied by a reduction in engine power output and piston/cylinder warping.

Attempts to address crankshaft degradation may include arranging a damper on the crankshaft in a vicinity of a connecting rod. One example approach is shown by Goloff et al. in U.S. Pat. No. 4,041,803. Therein, a first plurality of fins are arranged integrally with one or more elastomeric members of the damper. A second plurality of fins are arranged integrally with and peripherally around an inertia ring of the damper. Thus, the first and second pluralities of fins are positioned in the damper during a manufacturing process of the damper and may not be introduced as an aftermarket product. The second plurality of fins may be angled, however, a shape of and spacing between each fin of the second plurality is uniform.

However, the inventors herein have recognized potential issues with such systems. As one example, by arranging the fins integrally to the inertia ring, installation of the fins on preexisting vehicles that do not comprise the fins may be difficult and expensive. Additionally, during some engine loads producing a certain crankshaft rotational speed, the fins of Goloff may produce audible noises due to the uniformity of the fins. Thus, the second plurality of fins may produce an audible cacophony which may perturb one or more vehicle occupants. Furthermore, individual and/or combined effects of the inertia ring and hubs/spokes arranged within the damper may not sufficiently cool elastomeric elements of the damper.

In one example, the issues described above may be addressed by a system comprising a crankshaft comprising a damper with a plurality of radially extending spokes, and a stabilizing device comprising a plurality of cooling fins arranged in the damper. In this way, heat generated in the damper may be dissipated while an audible frequency produced between the fins may be mitigated due to the fins being shaped differently from one another.

As one example, a stabilizing device comprising the fins may be arranged within an inner hub of an assembled damper of a crankshaft on preexisting vehicles or future vehicles. More specifically, the stabilizing device may be arranged radially interior to a plurality of spokes of the damper. In one example, the stabilizing device is pressed against surfaces of the spokes. In this way, the fins may decrease installation costs and increase heat transfer between the damper and the fins. Additionally, shapes of and/or spaces between each of the fins may be randomized and/or selected from a Costas array. In some examples, the fins may be selected from the Costas array to prevent repetition of a shape of and/or space between the fins. By doing this, the stabilizing device comprising the differently spaced and shaped fins may be positioned within a damper post-production.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 illustrates a schematic of an engine optionally included in a hybrid vehicle.

FIGS. 2-3C and 5A and 5B are shown approximately to scale.

DETAILED DESCRIPTION

Figure 1:
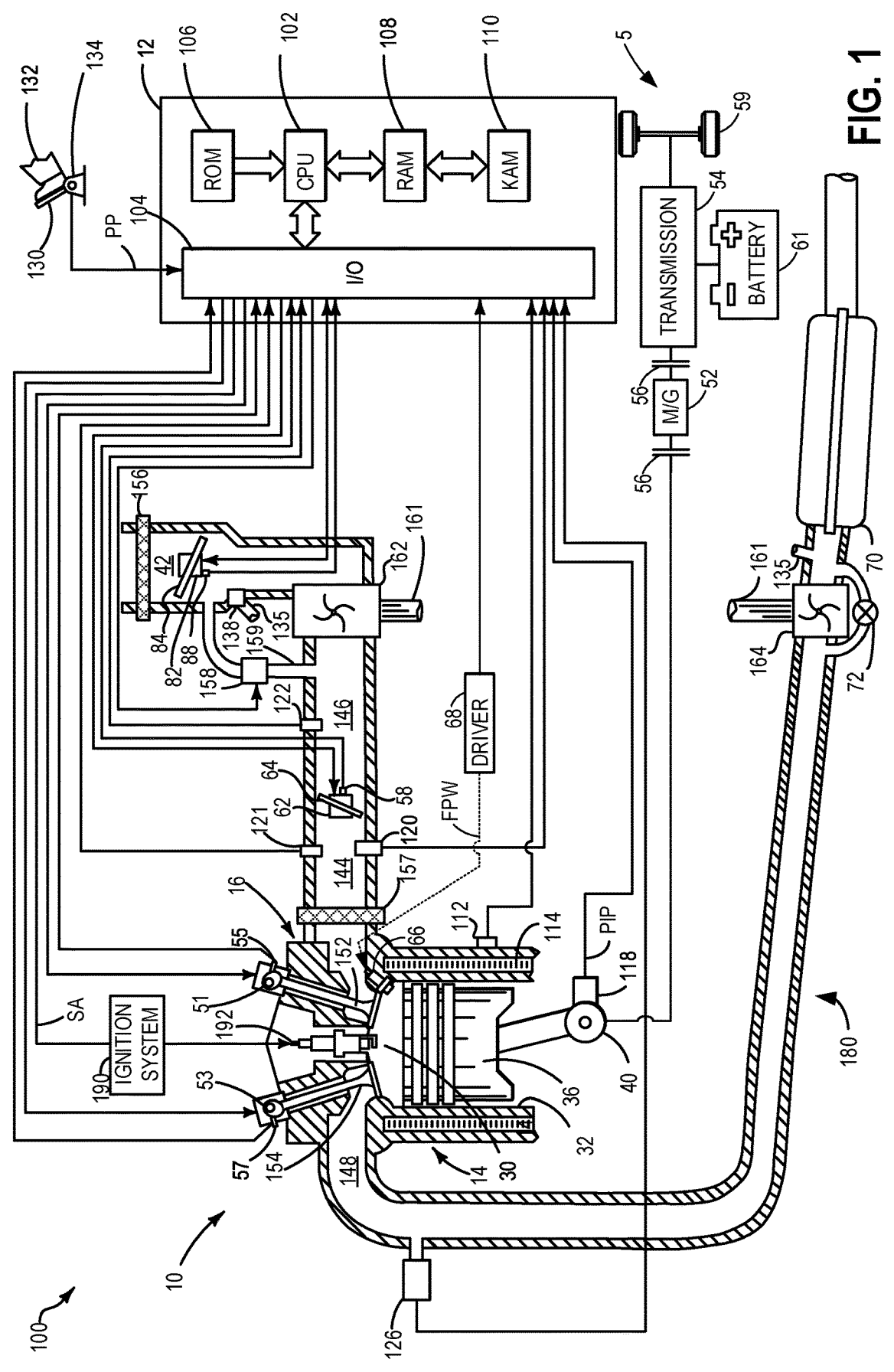

The following description relates to systems and methods for positioning a stabilizing device comprising a plurality of fins into a damper of a crankshaft. The stabilizing device comprising the fins may be positioned in an inner hub of the damper. The stabilizing device may be positioned within the damper during a manufacturing process of the vehicle or following completion of the vehicle. Said another way, the stabilizing device may not be directly molded to the damper and may be a separate piece, different from the damper. FIG. 1 illustrates one example of an engine included in a hybrid vehicle which may comprise the stabilizing device.

Figure 2:
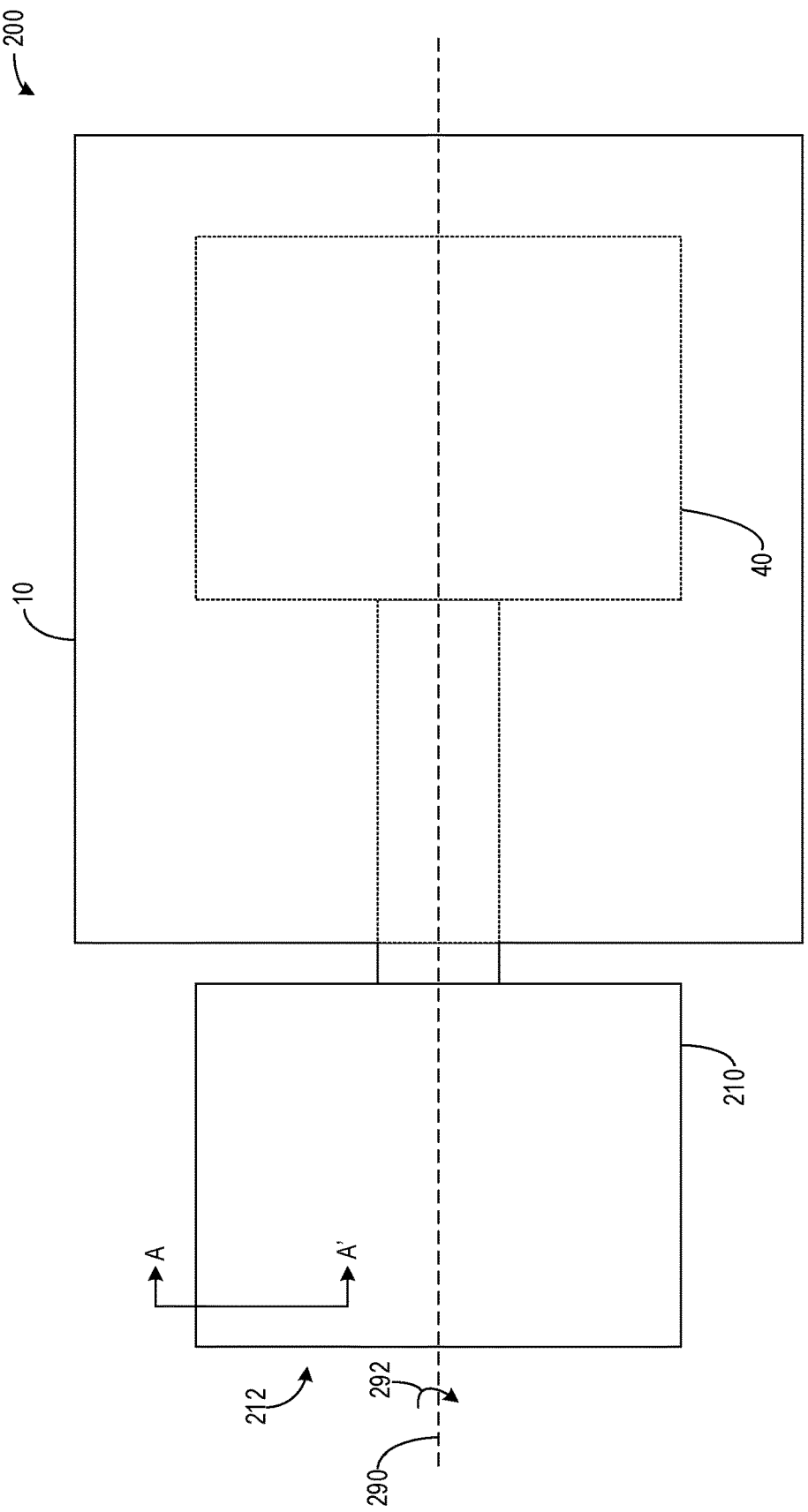
FIG. 2 shows a crankshaft comprising a damper and a stabilizing device.

An example of a crankshaft comprising a damper and the stabilizing device is shown in FIG. 2. The stabilizing device may be positioned proximally to a plurality of radially extending spokes.

Figure 3A:
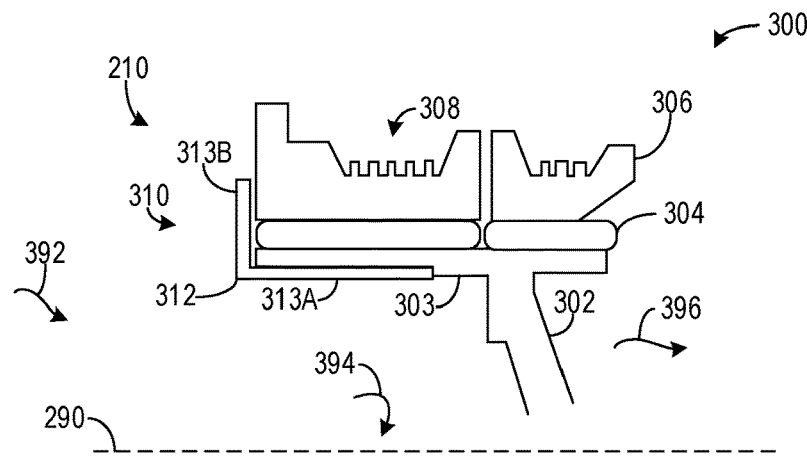
FIGS. 3A, 3B, and 3C show various embodiments of the fins.
Figure 3B:
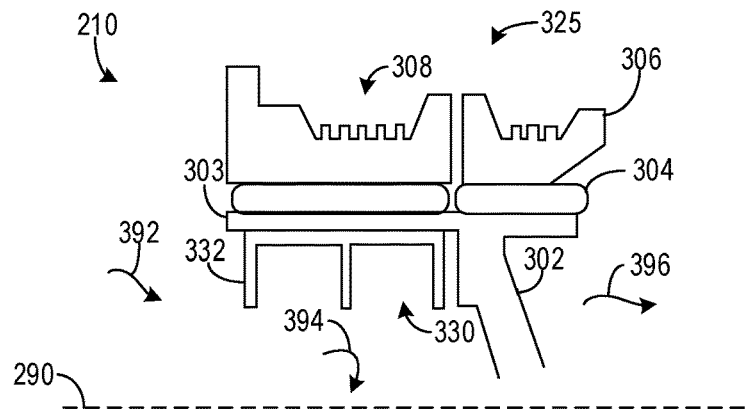
Figure 3C:
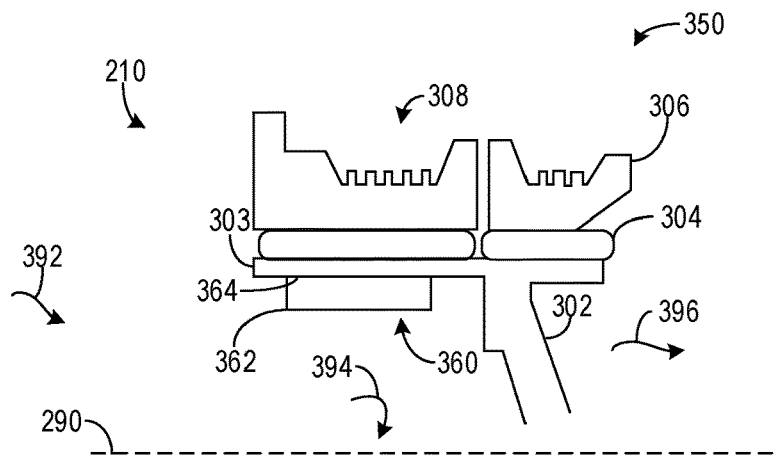
Figure 5A:
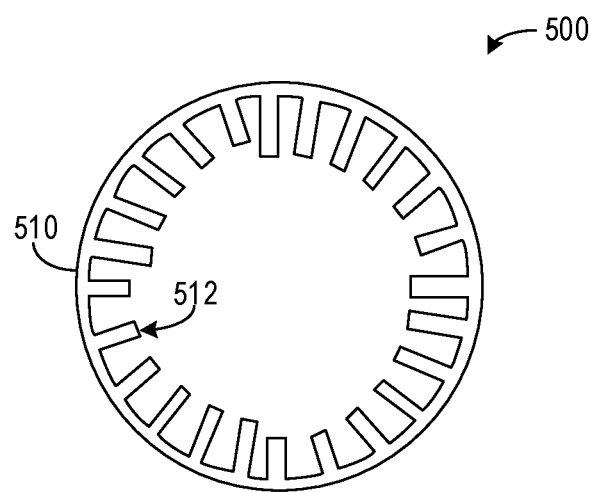
FIGS. 5A and 5B show randomly sized and spaced fins arranged on the stabilizing device.
Figure 5B:
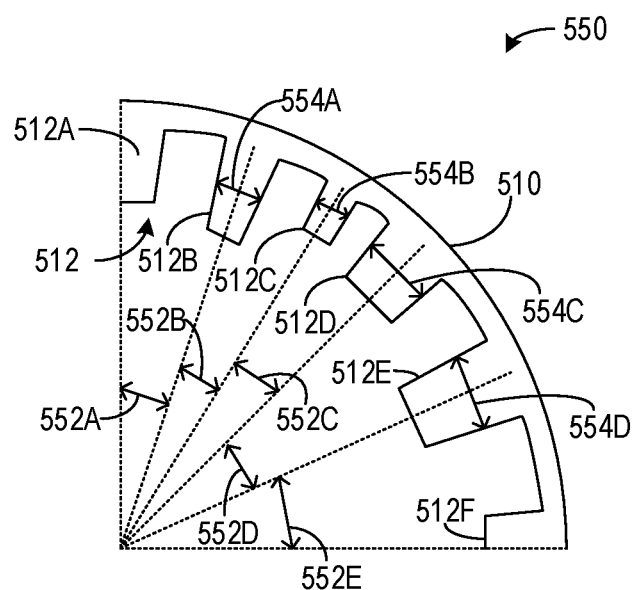

The stabilizing device may comprise a plurality of fins, wherein each of the fins and spaces between the fins is different. In one example, the fins are random and do not follow a pattern. An example arrangement is shown in FIGS. 5A and 5B, where each of the fins may be unique and spaces between each of the fins may also be unique. That is to say, no two fins may be identical and no two spaces may be identical. FIGS. 3A, 3B, and 3C show example shapes of the fins. It will be appreciated that sizes of the shapes may be adjusted to meet random parameters of the stabilizing device as will be described below.

Figure 4:
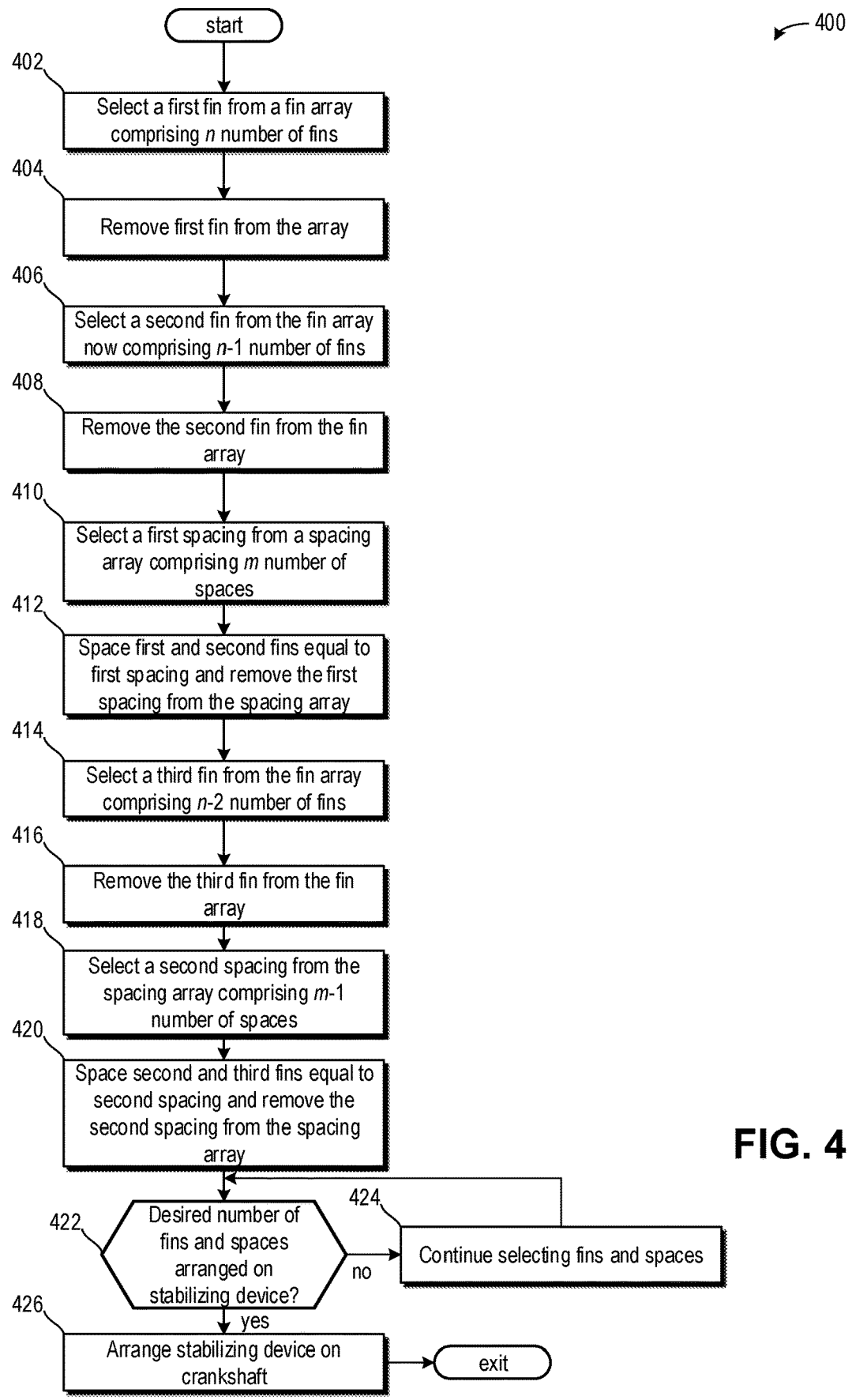
FIG. 4 shows a method for arranging the fins on the stabilizing device.

FIG. 4 shows a method for arranging the fins of the stabilizing device. The fins may be selected from a catalog and/or a look-up table and/or an array, wherein once a first fin is selected it may be removed from the array so that the first fin may not be selected again. For example, if a first fin is selected, then the first fin may be removed from the array such that a second fin may not be similar to the first. Thus, if a third fin is arranged on the stabilizing device, then the third fin may not be similar to each of the first and second fins. Spaces between the fins may be selected similarly, where a second spacing may not be identical to a first spacing, as will be described below.

FIGS. 1-3C and 5A and 5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore 20 may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 59. Electric machine 52 may also be operated as a generator to provide electrical power to charge battery 58, for example during a braking operation.

Turning now to FIG. 2, it shows an embodiment 200 of the engine 10 comprising the crankshaft 40 and a damper 210. As such, components previously introduced may be similarly numbered in subsequent figures. Portions of the crankshaft 40 arranged outside of the engine 10 are illustrated in solid lines. Thus, portions arranged inside the engine 10 and occluded by engine walls are shown in dashed lines.

The damper 210 may be arranged on an extreme end of the crankshaft 40 arranged outside of the engine 10. Each of the damper 210 and the crankshaft 40 may rotate about the axis of rotation 290 in a direction similar and/or opposite arrow 292. The damper 210 may be cylindrically shaped, however, other shapes may be realized without departing from the scope of the present disclosure, including but not limited to cure-shaped and sphere-shaped. The damper 210 may comprise one or more elastic elements integrally arranged therein between a plurality of spokes and an inertia ring to absorb a vibratory movement of the crankshaft 40. As such, removing the elastic elements may include at least some dissembling of the damper 210 and its internal components. As described above, individual and/or combined effects of the inertia ring and hubs/spokes arranged within the damper may not sufficiently cool elastomeric elements (e.g., elastomeric member 304 of FIG. 3A).

Turning now to FIG. 3A, it shows a first embodiment 300 of a cross-section of the damper 210 taken along the cutting plane A-A' of FIG. 2. The cross-section reveals a view of the inner hub (e.g., inner hub 212 of FIG. 2) of the damper 210. The axis of rotation 290 is included for reference.

Spoke 302 may extend radially outwardly from the extreme end of the crankshaft (e.g., crankshaft 40 of FIG. 2). The spoke 302 may be spaced away from other adjacent spokes such that a plurality of spokes may extend from the crankshaft with a plurality of spaces arranged therebetween for gases to flow therethrough. Each spoke 302 of the plurality of spokes may be shaped and spaced uniformly. An extreme end 303 of the spoke 302 distal to the crankshaft may extend in a direction parallel to the axis of rotation 290 and perpendicular to a body of the spoke 302. An elastomeric member 304 may be physically coupled to a first side of the extreme end 303 of the spoke 302. In one example, the first side of the extreme end faces a radially outward direction relative to a crankshaft. The elastomeric member 304 may comprise a rubber and/or plastic material. The elastomeric member 304 may be sandwiched between the first side of the extreme end 303 of the spoke 302 and an inertia ring 306. The inertia ring 306 may be substantially circular, with grooves 308 integrally arranged along its entire circumference. The grooves 308 may be shaped to align and receive a belt to mechanically drive other components. Inertia ring 306, may provide a cooling effect. However, the inertia ring 306 may comprise one or more materials for increasing a density of the damper. Thus, in one example, the inertia ring 306 comprises cast iron.

On a second side of the extreme end 303 of the spoke 302, a stabilizing device 310 comprising a fin 312 is physically coupled thereto. In one example, the second side faces a radially inward direction relative to the crankshaft. The fin 312 may comprise a thermally conductive material, the thermally conductive material may be less dense than the material of the inertia ring 306. The material of the fin 312 may include but is not limited to one or more of copper, manganese, marble, aluminum (alloy or pure), diamond, stainless steel, and Teflon. The stabilizing device 310 may comprise a number of fins equal to a number of spokes in some examples. Additionally or alternatively, the stabilizing device 310 may comprise a number of fins greater than or less than a number of spokes. In one example, the number of fins arranged on the stabilizing device 310 are greater than the number of spokes.

In one example, the stabilizing device 310 comprises a ring shape, wherein the fin 312 is one fin of a plurality of fins physically coupled to the stabilizing device 310. The stabilizing device 310 may be shaped to be positioned into the inner hub of the damper 210 following a manufacture of the damper 210 and its corresponding crankshaft. As such, the stabilizing device 310 may be positioned in the damper 210 during or post production of the damper 210. In some examples, the stabilizing device 310 may be forcibly fit into the inner hub of the damper 210. In one example, the stabilizing device 310 may be press fit into the inner hub, where surfaces of the fins are pressed against the extreme ends of the spokes. In some examples, the stabilizing device 310 may comprise an opening shaped to receive the crankshaft such that the stabilizing device 310 may be pressed against the crankshaft. In some examples, the stabilizing device 310 may slide onto the crankshaft.

The plurality of fins may be similar to the fin 312 in shape, however, the plurality of fins may comprise different dimensions than the fin 312 such that each fin arranged on the ring comprises different dimensions. Additionally or alternatively, spaces may be arranged between adjacent fins, further comprising where the spaces are each different from one another.

The fin 312 may comprise a bent-tube shape, where the tube comprises a cylindrical shape. In the cross-section depicted, the fin 312 comprises an L-shape, where a first portion 313A of the L is pressed against the extreme end 303 of the spoke 302 and where a second portion 313B of the L is pressed against one or more of the elastomeric member 304 and the inertia ring 306, in one example. More specifically, the second portion 313B may be in contact with only portions of the elastomeric member 304 and the inertia ring 306 furthest away from an engine. Additionally or alternatively, the second portion 313B may be spaced away from each of the inertia ring 306 and the elastomeric member 304.

Arrow 392 indicates a direction bulk air flow toward the damper 210. The direction of bulk air flow may be affected based on its contact with one or more components of the damper 210. For example, arrow 394 illustrates a portion of the bulk air flow circulating about the axis of rotation 290 with the components of the damper 210 including the spoke 302, stabilizing device 310, elastomeric member 304, and inertia ring 306. As another example, arrow 396 illustrates a portion of bulk air flow flowing through the spaces between the spokes to the portion of the crankshaft in the engine. At any rate, flows of arrow 394 and 396 may provide an increase cooling effect to the crankshaft. Furthermore, due to a rotation of the engine, the fin 312 may have a rotational velocity higher than a velocity of the bulk airflow, thereby increasing a convection coefficient of the bulk airflow and increasing the cooling effect provided to the crankshaft.

FIGS. 3B and 3C show embodiments 325 and 350 of the damper 210. Embodiments 325 and 350 may be substantially similar to embodiment 300, except that stabilizing device 330 comprising fin 332 of embodiment 325 and stabilizing device 360 comprising fin 362 of embodiment 350 may differ from one another and from stabilizing device 310 comprising fin 312 of the first embodiment. In some examples, the stabilizing devices 310, 330, and 360 may be substantially identical. In one example, a single stabilizing device may comprise each of the fins 312, 332, and 362. Regardless, each of the fins is in direct, face-sharing contact with the spoke 302. Each of the fins is pressed against, and flush with a flat surface along an extreme end of the spoke 302.

More specifically, fin 332 of FIG. 3B may comprise an E-shape, wherein a long side of the fin 332 is pressed against the spoke 302 and the prongs extend radially inward away from the inertia ring 306 toward the crankshaft. The fin 332 may not contact the elastomeric member 304 or the inertia ring 306.

The fin 362 of FIG. 3C may comprise a rectangular shape, wherein a longitudinal side 364 of the fin 362 is pressed against the extreme end 303 of the spoke 302. The fin 362 may extend from the spoke 302 in a radially inward direction away from the inertia ring 306 and toward the crankshaft. The fin 362 may not contact the elastomeric member 304 of the inertia ring 306.

As will be described in greater detail below, the fins 312, 332, and 362 may be arranged on a single stabilizing device, such as stabilizing device 310 of FIG. 3A. The fins 312, 332, and 362 may be randomly spaced apart from one another. An example of such a stabilizing device is shown in FIGS. 5A and 5B.

In one example, the stabilizing device is a single piece cast separately from the damper and the components arranged therein. Thus, the stabilizing device is not integrally formed within the damper and may be force fit into the inner hub of a preexisting damper. The stabilizing device may be shaped to press against one or more components of the damper. For example, fins of the damper may press against one or more surfaces of the spokes, elastomeric member, and inertia ring. In one example, the fins of the damper press against only the spokes.

Turning now to FIG. 4, it shows a method 400 for arranging a plurality of fins onto a stabilizing device. The method 400 begins at 402, which includes selecting a first fin from a fin array comprising n number of fins. The first fin may comprise a first shape and a first size. For example, the first shape may be an isosceles triangle having a first dimension. The array may be a database and/or look-up table comprising a plurality of fin template configurations.

The method 400 may proceed to 404, which may include removing the first fin from the array. Continuing based on the example provided above at 402, the array may no longer comprise the isosceles triangle having the first dimension. As such, the fin array may be a Costas array.

The method 400 may proceed to 406, which may include selecting a second fin from the fin array comprising n−1 number of fins. For example, the second fin may be a rectangle comprising a height of 3 mm. Additionally or alternatively, the second fin may be an isosceles triangle comprising a second dimension, where the second dimension is different than the first dimension.

The method may proceed to 408, which may include removing the second fin from the fin array. Thus, the fin array may no longer comprise fins identical to the first fin and the second fin.

The method may proceed to 410, which may include selecting a first spacing from a spacing array comprising m number of spaces. The spacing array may comprise spaces corresponding to a spacing between directly adjacent fins. The spaces may be between 1 to 10 mm.

The method may proceed to 412, which may include spacing the first and second fins apart from one another by a distance equal to the first spacing. Additionally, the first spacing may be removed from the spacing array such that subsequent spaces selected may not be identical to the first spacing. In some examples, the spacing array may be a Costas array.

The method may proceed to 414, which may include selecting a third fin from the fin array comprising n−2 number of fins. The third fin may not be identical to the first and second fins.

The method may proceed to 416, which may include removing the third fin from the fin array. Thus, subsequent fins may not be identical to the first, second, and third fins.

The method may proceed to 418, which may include selecting a second spacing from the spacing array comprising m−1 number of spaces. The second spacing may not be identical to the first spacing.

The method may proceed to 420, which may include spacing the second and third fins equal to the second spacing and removing the second spacing from the spacing array. Thus, the second and third fins are spaced apart from one another via the second spacing, which is different than the first spacing between the first and second fins. Furthermore, future selected fins and spaces may not be identical to the first, second, and third fins and the first and second spaces, respectively.

The method may proceed to 422, which may include determining if a desired number of fins and spaces are arranged on the stabilizing device. In one example, there are exactly x number of fins and x−1 number of spaces on the stabilizing device. The number of fins, x, may be greater than 1 and less than 100. In some examples, the number of fins, x, may be equal to a number between 5 to 20. In some examples, the number of fins, x, may be equal to a number between 5 to 15. In one example, the number of fins, x, is equal to a number between 8 to 12.

If the desired number of fins and spaces are not arranged on the stabilizing device, then the method may proceed to 424, which may include continuing to select fins and spaces.

If the desired number of fins and spaces are arranged on the stabilizing device, then the method may proceed to 426, which may include arranging the stabilizing device on the crankshaft. Turning now to FIG. 5A, it shows an embodiment 500 of a stabilizing device 510 comprising a plurality of fins 512. The stabilizing device 510 and one of the plurality of fins 512 may be used similarly to the stabilizing device 310 and fin 312 of FIG. 3A, stabilizing device 330 and fin 332, and/or stabilizing device 360 and fin 362. The stabilizing device 510 may be manufactured based on at least the method 400 of FIG. 4. As such, each fin of the fins 512 may be different than the other fins in length and/or width. Additionally, spaces between each of plurality of fins 512 may be different. The dimensions of the fins 512 and the spaces between each will be described in greater detail with respect to FIG. 5B.

Turning now to FIG. 5B, it shows an embodiment 550 of a quadrant of the stabilizing device 510. Dashed lines 590 approximately indicate a center of each of the fins 512. Six of the plurality of fins 512 are shown, including a first fin 512A, a second fin 512B, a third fin 512C, a fourth fin 512D, a fifth fin 512E, and a sixth fin 512F.

Spaces are arranged between each of the fins 512 such that the example of FIG. 5B illustrates five spaces. A first space 552A is arranged between the first fin 512A and the second fin 512B. The first space 552A may comprise a first arc length and/or correspond to a first portion of a circumference of the stabilizing device 510.

A second space 552B is arranged between the second fin 512B and the third fin 512C. The second space 552B may comprise a second arc length and/or correspond to a second portion of the circumference of the stabilizing device 510. The second arc length may not be equal to the first arc length.

A third space 552C is arranged between the third fin 512C and the fourth fin 512D. The third space 552C may comprise a third arc length and/or correspond to a third portion of the circumference of the stabilizing device 510. The third arc length may not be equal to the first and second arc lengths.

A fourth space 552D is arranged between the fourth fin 512D and the fifth fin 512E. The fourth space 552D may comprise a fourth arc length and/or correspond to a fourth portion of the circumference of the stabilizing device 510. The fourth arc length may not be equal to the first, second, and third arc lengths.

A fifth space 552E is arranged between the fifth fin 512E and the sixth fin 512F. The fifth space 552E may comprise a fifth arc length and/or correspond to a fifth portion of the circumference of the stabilizing device 510. The fifth arc length may not be equal to the first, second, third, and fourth arc lengths.

Furthermore, the second fin 512B may comprise a second fin width 554A. The third fin 512C may comprise a third fin width 554B. The fourth fin 512D may comprise a fourth fin width 512D. The fifth fin 512E may comprise a fifth fin width 512E. Each of the second fin width 554A, third fin width 554B, fourth fin width 554C, and fifth fin width 554D may be unequal and different. For example, the third fin width 554B may be smaller than the second fin width 554A, and the second fin width 554A may be smaller than the fourth fin width 554C. As described above, by randomizing a size and spacing of the fins 512, audible noises emanating from the damper may be mitigated compared to previous examples comprising uniformly sized and spaced fins.

In some examples, additionally or alternatively a plurality of fins may be arranged along the stabilizing device. Each of a size of the fins, a shape of the fins, and a space of the fins may be unique such that no two fins or spaces are identical. The stabilizing device may comprise two or more fins. In some examples, additionally or alternatively, the stabilizing device comprises between 2 to 30 fins. In one example, the stabilizing device comprises exactly 10 fins. For a crankshaft comprising more than one stabilizing device, each of the stabilizing devices may comprise different numbers of fins such that stabilizing devices arranged along a single crankshaft are not identical. The fins may extend radially outward in a direction perpendicular to a crankshaft. Additionally or alternatively, the fins may extend in a direction parallel to the crankshaft. In some examples, a first portion of the fins may extend radially outward and direct an airflow parallel to the crankshaft and a second portion of the fins may extend parallel to the crankshaft and direct an airflow perpendicular to the crankshaft.

The fins 302 may comprise a variety of shapes, including but not limited to triangular, square-like, rectangular, pentagonal, and the like. Additionally or alternatively, the fins 302 may comprise an L-shape, an E-shape, and a rectangular shape, such as the shape of fin 375. Dimensions of the fins may be adjusted such that while multiple triangular fins may be arranged on a single stabilizing device, each of the triangular fins may comprise disparate dimensions such that no two fins are identical. A single stabilizing device may comprise a plurality of fins having a plurality of shapes, including each of the fins. By arranging fins of different sizes and shapes in the stabilizing device, a constructive interference between the fins may not occur, thereby preventing and/or mitigating a likelihood of an audible cacophony emanating from the engine.

In some examples, the fins may be arranged such that a majority of the fins are not identical, wherein the majority may include greater than 50% of the fins. In some examples, additionally or alternatively, the fins may be arranged such that directly adjacent fins are not identical. At any rate, embodiments of the stabilizing device may include fins where a minority of the fins are identical and a majority are not identical.

In this way, a crankshaft may be equipped with a damper and a stabilizing device positioned in an inner hub of the damper. The stabilizing device and the damper may be two separate and distinct pieces, the stabilizing device being shaped to insert into the damper arranged on the crankshaft. The stabilizing device may comprise a plurality of differently sized and shaped fins configured to cool the damper. The technical effect of arranging the stabilizing device having differently sized and shaped fins is to decrease a temperature of the damper, decrease production of audible noises, and increase a number of vehicles which may receive the stabilizing device. Additionally, by introducing the stabilizing device as an external component, a cooling effect of the stabilizing device may increase relative to fins molded integrally with the damper.

An example of a system comprises a crankshaft comprising a damper with a plurality of radially extending spokes and a stabilizing device comprising a plurality of cooling fins arranged in the damper between the plurality of spokes and the crankshaft. A first example of the system further includes where the stabilizing device is pressed against radially interior surfaces of the plurality of spokes. A second example of the system, optionally including the first example, further includes where the plurality of cooling fins are randomly shaped and space, and where a shape of and a space between each cooling fin of the plurality of cooling fins is different. A third example of the system, optionally including the first and/or second examples, further includes where an elastomeric member arranged between radially exterior surfaces of the plurality of spokes and an inertia ring, and where the elastomeric member is spaced away from the stabilizing device and the plurality of cooling fins. A fourth example of the system, optionally including one or more of the first through third examples, further includes where the plurality of cooling fins divert airflow around the damper and toward a portion of the crankshaft arranged in the engine. A fifth example of the system, optionally including one or more of the first through fourth examples, further includes where the stabilizing device is inserted into an inner hub along a body of the crankshaft arranged outside of an engine, and where the cooling fins of the stabilizing device extend between only the crankshaft and the plurality of spokes. A sixth example of the system, optionally including one or more of the first through fifth examples, further includes where the stabilizing device and the plurality of cooling fins comprise one or more of copper, manganese, marble, aluminum (alloy or pure), diamond, and Teflon.

An example of a stabilizing device comprises a plurality of fins shaped to be arranged radially interior to a plurality of radially extending spokes arranged in a damper, the plurality of spokes physically coupled to a portion of a crankshaft arranged outside of an engine. A first example of the stabilizing device further includes where each fin of the plurality of fins is unique in one or more of shape and dimension. A second example of the stabilizing device, optionally including the first example, further includes where a space between each fin of the plurality of fins is unique. A third example of the stabilizing device, optionally including the first and/or second examples, further includes where the plurality of fins increase an airflow to the portion of the crankshaft interior to the engine. A fourth example of the stabilizing device, optionally including one or more of the first through third examples, further includes where the inertia ring of the damper is radially exterior to the plurality of spokes, and where an elastomeric member is arranged between the inertia ring and the plurality of spokes, and where the plurality of fins only contact portions of one or more of the inertia ring and the elastomeric member furthest away from an engine. A fifth example of the stabilizing device, optionally including one or more of the first through fourth examples, further includes where the plurality of fins are triangular, L-shaped, E-shaped, square-shaped, and rectangular. A sixth example of the stabilizing device, optionally including one or more of the first through fifth examples, further includes where the plurality of fins comprises three or more fins. A seventh example of the stabilizing device, optionally including one or more of the first through sixth examples, further includes where the plurality of fins are in face-sharing contact with the portion of the crankshaft and radially inwardly facing surfaces of the plurality of spokes.

In some examples, a method comprises randomizing a shape of each fin of a plurality of fins and a space between adjacent fins of the plurality of fins of a stabilizing device inserted into a damper of a crankshaft. A first example of the method further includes where the shape of the fin is selected from a fin array, wherein the fin array is a Costas array. A second example of the method, optionally including the first example, further includes where the fin is a first fin, and where the shape of the first fin is removed from the fin array, and where a second fin comprises a shape different than the first fin. A third example of the method, optionally including the first and/or second examples, further includes where the shape of the fin comprises a type of shape and a size of the type of shape, wherein the size includes a width and length. A fourth example of the method, optionally including one or more of the first through third examples, further includes where the space is selected from a spacing array, wherein the spacing array is a Costas array. A fifth example of the method, optionally including one or more of the first through fourth examples, further includes where the stabilizing device is inserted into an inner hub of the damper and pressed against surfaces of a plurality of spokes arranged within the damper. A sixth example of the method, optionally including one or more of the first through fifth examples, further includes where the stabilizing device comprises one or more of copper, manganese, marble, aluminum, diamond, and Teflon.

An embodiment of a system, comprising a crankshaft comprising a damper arranged outside of an engine and a stabilizing device arranged interior to an inner hub of the damper and pressed against a plurality of spokes of the damper, where the stabilizing device comprises x number of fins, each fin of the fins being different in one or more of shape and size. A first example of the system further includes where the stabilizing device comprises x−1 number of spaces, wherein each space of the spaces is arranged between adjacent fins, and where each space is different. A second example of the system, optionally including the first example, further includes where the fins are selected from a fin array, and where a first fin selected from the fin array is removed from the fin array, and where a second fin is selected from the fin array and is not identical to the first fin. A third example of the system, optionally including the first and/or second examples, further includes where the fins are thermally coupled to the damper. A fourth example of the system optionally including one or more of the first through third examples, further includes where the fins create first and second airflows, where a first airflow flows between the spokes to a portion of the crankshaft arranged in the engine, and where the second airflow rotates with the fins outside of the engine. A fifth example of the system optionally including one or more of the first through fourth examples, further includes where the fins are triangular, L-shaped, E-shaped, square-shaped, and rectangular. A sixth example of the system optionally including one or more of the first through fifth examples, further includes where the stabilizing device comprises 5 to 20 fins. A seventh example of the system optionally including one or more of the first through sixth examples, further includes where the fins contact one or more of an elastomeric member and inertia ring of the crankshaft.

Another embodiment of a system comprises an engine comprising a crankshaft, wherein a portion of the crankshaft extends out of the engine, a damper being arranged on the portion of the crankshaft, wherein a plurality of spokes extend in a radially outward direction from the crankshaft within an inner hub of the damper, and where an elastomeric member is sandwiched between a first surface of the spokes and an inertia ring, and a stabilizing device pressed against a second surface of the spokes, the second surface being opposite the first surface, and where the stabilizing device comprises a plurality of fins radially extending therefrom, wherein each fin of the plurality of fins is different via one or more of its length, width, and spacing between it and an adjacent fin. A first example of the system further includes where the plurality of fins are spaced away from the inertia ring and the elastomeric member. A second example of the system, optionally including the first example, further includes where the plurality of fins contact one or more of the elastomeric member and the inertia ring. A third example of the system, optionally including the first and/or second examples, further includes where the plural of fins are thermally coupled to the spokes. A fourth example of the system, optionally including one or more of the first through third examples, further includes where the stabilizing device is press fit into the inner hub.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a crankshaft comprising a damper having a plurality of radially extending spokes; and
a stabilizing device comprising a plurality of cooling fins arranged in the damper, wherein the plurality of cooling fins divert airflow around the damper and toward a portion of the crankshaft arranged in an engine.

2. The system of claim 1, wherein the stabilizing device is arranged between the plurality of spokes and the crankshaft, the stabilizing device being pressed against radially interior surfaces of the plurality of spokes.

3. The system of claim 1, wherein no two cooling fins of the plurality of cooling fins are identical, and each of the plurality of cooling fins is spaced apart from one another, where no two spaces are identical.

4. The system of claim 1, further comprising an elastomeric member arranged between radially exterior surfaces of the plurality of spokes and an inertia ring, and where the elastomeric member is spaced away from the stabilizing device and the plurality of cooling fins.

5. The system of claim 1, wherein the stabilizing device is inserted into an inner hub along a portion of the crankshaft arranged outside of the engine, and where the cooling fins of the stabilizing device extend between only the crankshaft and the plurality of spokes.

6. The system of claim 1, wherein the stabilizing device and the plurality of cooling fins comprise one or more of copper, manganese, marble, aluminum (alloy or pure), diamond, and Teflon.

7. A stabilizing device, comprising:
a plurality of fins shaped to fit radially interior to a plurality of radially extending spokes arranged in a damper, the plurality of spokes adapted to be coupled to a portion of a crankshaft arranged outside of an engine, wherein the plurality of fins supplement air flow to a portion of the crankshaft interior to the engine.

8. The stabilizing device of claim 7, wherein each fin of the plurality of fins comprises a shape and dimension that are different from other fins of the plurality of fins.

9. The stabilizing device of claim 7, wherein a space between two fins of the plurality of fins is different from a space between two other fins of the plurality of fins.

10. The stabilizing device of claim 7, wherein an inertia ring of the damper is radially exterior to the plurality of spokes, and where an elastomeric member is arranged between the inertia ring and the plurality of spokes, and where the plurality of fins only contact portions of one or more of the inertia ring and the elastomeric member furthest away from the engine.

11. The stabilizing device of claim 7, wherein a shape of each fin of the plurality of fins is one or more of triangular, L-shaped, E-shaped, square-shaped, and rectangular.

12. The stabilizing device of claim 7, wherein the plurality of fins comprises three or more fins.

13. The stabilizing device of claim 7, wherein the plurality of fins is in face-sharing contact with the portion of the crankshaft outside of the engine and radially inwardly facing surfaces of the plurality of spokes.

14. A system, comprising:
an engine comprising a crankshaft, wherein a portion of the crankshaft extends out of the engine, a damper being arranged on the portion of the crankshaft; wherein
a plurality of spokes extend in a radially outward direction from the crankshaft within an inner hub of the damper, and where an elastomeric member is sandwiched between a first surface of the spokes and an inertia ring; and
a stabilizing device pressed against a second surface of the spokes, the second surface being opposite the first surface, and where the stabilizing device comprises a plurality of fins radially extending therefrom, wherein the plurality of fins supplements air flow to a portion of the crankshaft interior to the engine.

15. The system of claim 14, wherein the plurality of fins is spaced away from the inertia ring and the elastomeric member, wherein no two fins of the plurality of fins are identical, and wherein each of the plurality of fins is spaced apart from one another, where no two spaces are identical.

16. The system of claim 14, wherein the plurality of fins contact one or more of the elastomeric member and the inertia ring.

17. The system of claim 14, wherein the plurality of fins is thermally coupled to the spokes.

18. The system of claim 14, wherein the stabilizing device is press fit into the inner hub.

* * * * *